Patented May 29, 1951

2,555,008

UNITED STATES PATENT OFFICE 2,555,008

BENZYL PHENACETURATE

Stanley T. Rolfson, James H. Hunter, and Jack W. Hinman, Kalamazoo, Mich., assignors to The Upjohn Company, Kalamazoo, Mich., a corporation of Michigan No Drawing. Original application November 2, 1945, Serial No. 626,429. Divided and this application February 18, 1949, Serial No. 77,276

1 Claim. (Cl. 260—471)

This invention concerns compounds related to penicillin G, particularly to hydrohalides of esters of compounds closely related to pseudo-penicillin G, and to intermediate compounds and methods useful in their preparation. This application is a division of copending application Serial No. 626,429, filed November 2, 1945, and subsequently abandoned.

We have prepared hydrohalides of a series of esters, one of which esters is closely related to, if not identical with, methyl pseudo-penicillin G, together with a number of useful new compounds intermediate thereto, determined characteristic properties of the ester hydrohaldies and intermediates whereby they may be recognized, and found them useful as chemical intermediates, particularly in the preparation and study of compounds related to penicillin.

The properties of the new ester hydrohalides and the reactions involved in their preparation indicate them to be hydrohalides of esters of substituted 4-(4-carboxy-thiazolidinyl-2)-5(4)-oxazolones, having the structural formula

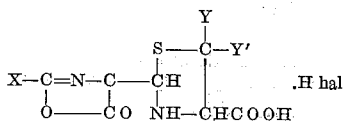

wherein X is selected from the group consisting of benzyl and phenyl radicals and Y and Y' are selected from the group consisting of hydrogen and alkyl radicals. Y and Y' may be, but are not necessarily, identical.

These compounds contain an azlactone-thiazolidine structure formerly thought to exist in penicillin G. The value of the new ester hydrohalides, and of the new compounds related and intermediate thereto, as starting materials in the preparation of compounds related to penicillin G and in the elucidation of the structure of the latter is apparent.

The incorporation herein of the letter "G" as an integral part of the names "pseudo-penicillin G," "methyl pseudo-penicillin G" and also in the amines of certain compounds of somewhat simpler constitution but related thereto, such as "penicilloic acid G" and "penaldic acid G" and their esters and derivatives, follows the established custom in the penicillin art and serves to distinguish those compounds which contain a benzyl group in a certain position in the molecule, and are similar in this respect to penicillin G, from other compounds identical in every way with them except for the substitution of a different group, e. g., a hydroxy-benzyl group, such as is thought to be present in the same position in penicillin X, for the benzyl group in the molecule. By penicillin G as used herein we mean that fraction of the mixture of penicillins obtained by the fermentation of Penicillium notatum which can be separated from the mixture by chromatographic fractionation and which is distinguished from the other penicillins in the mixture by having a benzyl group in the molecule.

Although the invention will be described with particular respect to the hydrochloride of an ester of 2-benzyl-4(4-carboxy-5,5-dimethyl-thiazolidinyl-2)-5(4)-oxazolone wherein X of the above noted structural formula is a benzyl radical and Y and Y' are both methyl radicals, and to compounds intermediate thereto, it is understood that the invention also contemplates other hydrohalides, e. g., hydrobromides, and compounds and processes wherein X is a phenyl radical and wherein Y and Y' are hydrogen or alkyl radicals other than methyl as well as compounds involving any combination of these values for X, Y and Y'. Compounds wherein X is a phenyl radical are designated by adding the prefix "nor" to the name of the corresponding benzyl compound. Compounds wherein Y and Y' are each hydrogen are designated by inserting the prefix "des-dimethyl" in the name of the corresponding compound wherein Y and Y' are both methyl radicals.

Reactions illustrating the preparation of the new compounds wherein the hydrohalide is a hydrobromide, X is a benzyl radical, and Y and Y' are each methyl radicals are shown schematically in the accompanying diagram wherein R and R' may be alkyl, aralkyl, or cycloalkyl in nature and R'' represents the residue obtained by subtracting —NH$_2$ from a primary amine. Similarly, reactions illustrating the preparation of the new compounds wherein X is a phenyl radical are written by merely substituting phenyl for the benzyl substituent in each of the formulae.

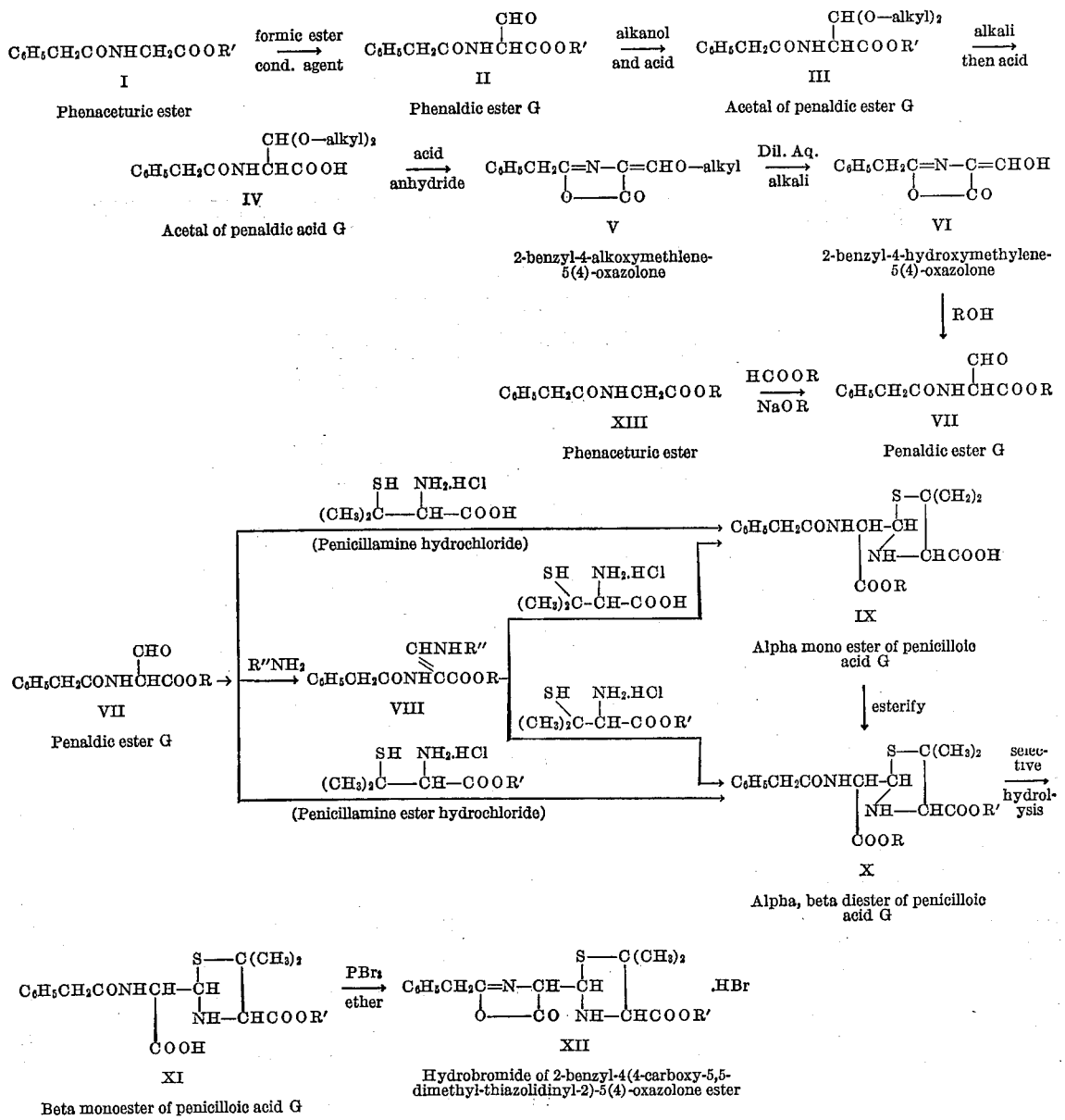

One convenient way of preparing hydrohalides of esters of 2-benzyl-4-(4-carboxy-5,5-dimethyl-thiazolidinyl-2)-5(4)-oxazolone (VII) described herein includes the selective hydrolysis of an alpha, beta diester of penicilloic acid G (X), i. e., a diester of alpha-(phenylacetylamino)-alpha-(4-carboxy-5,5-dimethyl-thiazolidinyl-2) - acetic acid, the alpha ester group of which, i. e., the ester group not attached directly to the thiazolidine group, may be hydrolyzed selectively in preference to the beta ester group, i. e., to the ester group attached to the fourth carbon atom of the thiazolidine ring. Acidification of the hydrolysis mixture yields a beta monoester of penicilloic acid G (XI). A diester of penicilloic acid G in which the alpha ester group is a benzyl ester may be prepared conveniently, is particularly susceptible to selective hydrolysis of the alpha ester group with little or no hydrolysis of the beta ester group, particularly when the latter is an alkyl ester, and has been used with entire satisfaction in the process.

Treatment of a beta monoester of penicilloic acid G with a phosphorous trihalide, such as the tribromide or trichloride, closes the azlactone ring and forms a hydrohalide of an ester of 2-benzyl-4-(4-carboxy-5,5-dimethyl- thiazolidinyl-2)-5(4)-oxazolone (VII).

Alpha, beta diesters of penicilloic acid G (X) are prepared readily by condensing an ester of penaldic acid G (VII), i. e., an ester of alpha-(phenylacetylamino)-alpha-formyl - acetic acid, with penicillamine (2-amino-3-thiol-3-methyl-butanoic acid), usually in the form of its hydrochloride, to form an alpha monoester of penicilloic acid G (IX) and subsequently esterifying the beta carboxy radical of the latter compound, e. g., with diazomethane. If desired, an ester of penicillamine, e. g., the methyl ester, may be condensed with an ester of penaldic acid G (VII) and an alpha, beta diester of penicilloic acid G (X) obtained directly. Alternatively the aldehyde group of an ester of penaldic acid G (VII) may be first condensed with an amine, such as benzyl amine, to form a condensation product (VIII), which is thought to be a tautomer of an azomethine or Schiff's base, and the latter then condensed with penicillamine or its ester to form an alpha monoester (IX) or an alpha, beta diester (X), respectively, of penicilloic acid G. Somewhat better yields are obtained by condensing penicillamine or its ester with an amine condensation product of penaldic ester G rather than with penaldic ester G itself, due to the reduced tendency for side reactions with the aldehyde radical to occur and the consequent formation of products undesirable in this instance. Optically active forms of penicillamine or its ester may be used with the formation of corresponding optically active mono- and diesters of penicilloic acid G.

Esters of penaldic acid G (VII) useful in preparing diesters of penicilloic acid G are obtained readily from the corresponding esters of phenaceturic acid (XIII), i. e., from the corresponding esters of phenylacetylaminoacetic acid, by condenning a phenaceturic ester with an ester of formic acid, preferably an ester of the same alcohol as the phenaceturate, in the presence of a condensing agent. Although the preparation of a desired ester of penaldic acid G is preferably carried out using the corresponding ester of phenaceturic acid, the latter may in certain instances not be readily available, in which case an alternate procedure may be used. In such alternate procedure a readily available phenaceturic ester (I) is condensed with an ester of formic acid, which need not necessarily be an ester of the same alcohol as is the phenaceturate, to form an ester or a mixture of esters of penaldic acid G (II), which is in turn converted to an acetal of penaldic ester G (III) and the ester radical of the latter then hydrolyzed to form an acetal of penaldic acid G (IV). The latter acid, upon treatment with the anhydride of an organic acid, is converted to an alkyl ether of 2-benzyl-4-hydroxymethylene-5(4)-oxazolone (V) which may be hydrolyzed to 2-benzyl-4-hydroxymethylene-5(4)-oxazolone (VI). This hydroxymethyleneoxazolone is converted by treatment with an alcohol to the corresponding ester of penaldic acid G (VII). By using an alcohol in the last described step, corresponding to the desired penaldic ester G, the latter may thus be obtained from substantially any ester or mixture of esters of phenaceturic acid which may be available.

Esters of phenaceturic acid may be obtained in a state of high purity by treating an alcoholic dispersion of phenaceturic acid with a hydrogen halide precursor. This results in the formation in substantially pure form of a phenaceturic acid ester corresponding to the alcohol employed.

The expression "hydrogen halide precursor" as herein employed refers to compounds such as acetyl chloride, acetyl bromide, acetyl iodide, phosphorous trichloride, phosphorous tribromide, thionyl chloride, thionyl bromide, phosphorous oxychloride, phosphorous oxybromide, ethyl chlorocarbonate, phenylacetylamine-acetyl chloride, and sulfuryl chloride, which react with an alcohol to liberate free hydrogen halide.

Phenaceturic esters, particularly benzyl phenaceturate which has not heretofore been prepared in purified form, are of especial value in the preparation of compounds, e. g., diesters of penicilloic acid G, useful in the study and synthesis of compounds related to penicillin G.

In the preparation of a phenaceturic ester it is convenient to disperse phenaceturic acid in an alcohol and add a hydrogen halide precursor to the mixture. Although a considerable excess of alcohol is desirable, it is not essential that all of the phenaceturic acid be dissolved. The hydrogen halide precursor is preferably added portionwise to a dispersion of phenaceturic acid in the alcohol corresponding to the ester desired with continued agitation over a period of time and at such a rate that the temperature of the reaction mixture does not rise materially above 50° C. During the addition of the hydrogen halide precursor, the suspended phenaceturic acid dissolves gradually in the alcohol. After all of the hydrogen halide precursor has been added, the reaction mixture is allowed to stand for a considerable period of time in order that the reaction may proceed to completion. The mixture is then subjected to evaporation or fractional distillation under reduced pressure to remove excess alcohol present therein, and the residue is dissolved in a water-immiscible organic solvent. This solution is washed and extracted with dilute aqueous alkali and thereafter with water to remove unreacted phenaceturic acid, traces of hydrogen halide precursor, and hydrogen halide present therein. The aqueous alkaline wash liquors are combined and may be processed to recover phenaceturic acid.

The residual solution of crude reaction product in a water-immiscible solvent as obtained from the foregoing operation is dried over a suitable desiccating agent, filtered, and distilled under reduced pressure to remove the water-immiscible organic solvent. The residue is crystallized from a suitable solvent or mixture of solvents, separated, and dried. The residual mother liquor from the initial crystallization may be concentrated and the operation repeated to obtain a further crop of ester crystals. This step may be repeated as often as necessary to recover a high yield of the desired phenaceturic ester compound.

Although the proportions of reactants employed in the preparation of a phenaceturic ester are not critical, a considerable molecular excess of alcohol is desirable. A minimum of from ten to twelve molecular equivalents of the alcohol for each molecular equivalent of phenaceturic acid has been found to give good yields. Any suitable amount of hydrogen halide precursor may be employed. The preferred amount of the latter reactant varies widely with the particular precursor selected, the only limitation being that sufficient of it should be used to provide a catalytic concentration of hydrogen halide in the liquid reaction mixture.

The temperature of operation and the time required to accomplish the formation of a phenaceturic ester are interdependent. The method may be carried out at any temperature below the decomposition temperature of the reaction mixture. Although from twelve to twenty-four hours may be required to complete the reaction at room temperature or slightly above, this period is much shorter at higher temperatures.

The water-immiscible organic solvent employed in the preparation of the solution of crude phenaceturic ester product following the separation of excess alcohol must not be reactive with the products of reaction or with the alkali and water as used in the extraction step. Representative solvents which may be so employed are chloroform, methyl chloroform, carbon tetrachloride, and ethylene chloride.

In the extraction of acidic substances from the solution of crude phenaceturic ester product in an organic solvent, a ten per cent aqueous solution of sodium carbonate has been found satisfactory. Dilute aqueous sodium or potassium hydroxides, potassium carbonate, or other alkaline reacting inorganic salt may also be used. In the drying of the organic solvent solution, hygroscopic salts such as anhydrous magnesium sulfate, magnesium chloride, calcium chloride, and sodium sulfate may be employed.

Phenaceturic esters which may be prepared using the procedure just described include the methyl, ethyl, n-propyl, isopropyl, tertbutyl, secbutyl, n-pentyl, benzyl, alphaphenylethyl, betaphenylethyl, allyl, 2-chloroallyl, 3-chloropropyl, cycloheptyl, chlorocyclohexyl, methylcyclohexyl, and 4-chlorobutyl esters and many others.

The condensation of a phenaceturic ester with a formic ester to form a penaldic ester G is carried out conveniently by adding a mixture of formic ester and phenaceturic ester slowly and with agitation to a cooled suspension of a condensing agent in an inert solvent. Inert solvents which may be used include anhydrous ether, benzene, toluene, xylene, hexane, cyclohexane and many others. Condensing agents favoring the Claisen condensation with aldehydes, such as sodium and a trace of alcohol, sodium alkoxide or sodamide, are effective in promoting the reaction.

It is preferred, when a pure penaldic ester G is desired, and particularly when an alkyl, cycloalkyl or aralkyl ester is desired, to use a phenaceturic ester, a formic ester, and an alkoxide catalyst each derived from the same alcohol since otherwise considerable exchange of alcohol groups among the several reactants and products may occur and the final product may be a mixture of penaldic esters. This difficulty is eliminated if only compounds derived from a single alcohol are present in the reaction mixture.

The condensation of a phenaceturic ester with a formic ester is carried out advantageously under an atmosphere of nitrogen or other inert gas. The reaction temperature is preferably maintained at below about 20° C. to minimize undesirable side reactions. A turbid solution results soon after mixing is completed followed shortly by separation of the condensation product, usually in the form of a solid or of a viscous oil. After a few hours the reaction is substantially complete and the product may be worked up in any suitable way. Thus the inert solvent may be decanted, the residue shaken with a mixture of ice, dilute mineral acid, and a water-immiscible liquid, e. g., chloroform, and the layers separated. Removal of the extractant liquid from the water-insoluble layer e. g., by distillation in vacuo, leaves the desired penaldic ester G in substantially pure form.

In this manner there may be prepared alkyl, substituted alkyl, aryl, substituted aryl, cycloalkyl and substituted cycloalkyl esters of penaldic acid G, provided the substituent groups present are not reactive under the reaction conditions. Such non-reactive substituent groups include hydrocarbon, chlorine, bromine and numerous other radicals. Among the esters of penaldic acid G which may be prepared in the manner just described may be mentioned the methyl, ethyl, propyl, isopropyl, amyl, octyl, beta chloroethyl, beta bromoethyl, o-chlorobenzyl, p-bromobenzyl, beta phenylethyl, beta tolylethyl, alpha phenylethyl, gamma phenylpropyl, phenyl, naphthyl, o-chlorophenyl, p-bromophenyl, 2,4-dichlorophenyl, cyclohexyl, methylcyclohexyl and chlorocyclohexyl esters and many others.

Benzyl penaldate G is, as herein pointed out, of particular value in the preparation of compounds related to penicillin G. A particularly advantageous procedure for its preparation involves the condensation of benzyl phenaceturate with benzyl formate in an inert solvent using finely divided sodium as a condensing agent. Although condensation products may be obtained containing benzyl penaldate G using benzyl phenaceturate, a formic ester other than benzyl formate, and a condensing agent other than metallic sodium, the product is invariably of poor quality. When, however, the procedure is carried out using benzyl formate and metallic sodium a high yield of benzyl penaldate G is obtained readily in a state of high purity not heretofore attained. Crystalline benzyl penaldate G so obtained has a melting point higher than 90° C., and usually between 97° and 98° C. Pure benzyl penaldate G has not been described previously.

In certain instances an appropriate ester of phenaceturic acid from which to prepare a desired penaldic ester G may not be readily available. In such case the desired penaldic ester may be prepared readily from any other ester of phenaceturic acid which may be available by first converting the available phenaceturic ester to the corresponding phenaldic ester G by the method of the preceding paragraphs and then proceeding by way of the acetal and oxazolone as indicated previously.

Conversion of a penaldic ester G to an acetal may be accomplished readily by dissolving the ester in an anhydrous alkanol containing a dissolved anhydrous acid, preferably hydrogen chloride, and allowing the mixture to stand at a low temperature for several hours. Usually a low molecular weight alkanol such as methanol, ethanol, or butanol is employed, although any alcohol capable of forming an acetal with penaldic ester G may be employed. Satisfactory results are obtained by using a large molecular excess of alcohol to serve as a reaction solvent and sufficient anhydrous hydrogen chloride to at least partially saturate the alcohol. Acetal formation is usually carried out at a somewhat reduced temperature, e. g., at from 20° to −10° C. or lower, and the reaction is usually substantially complete in from 4 to 24 hours.

The acetal may be recovered from the reaction mixture in any convenient manner, one such way being to volatilize hydrogen chloride and excess alkanol under reduced pressure. Alternatively, when a water-miscible alcohol is used in forming the acetal, the reaction mixture may simply be diluted with water and the acetal ester of penaldic acid G recovered directly as a viscous oily or solid substance sufficiently pure for most purposes. To effect a further degree of purification the crude product may be taken up in ether, the ethereal solution washed with cold water and dilute alkali, dried, and the ether volatilized. Some of the acetals of ethers of penaldic acid G may be fractionally distilled. In this manner acetals of esters of penaldic acid G mentioned previously and of many others may be prepared using methyl, ethyl, propyl, isopropyl, butyl, isobutyl, secondary butyl, amyl, hexyl, nonyl, decyl, or other alcohols. The acetals are usually oily substances, although the higher acetals may be low-melting solids.

Following formation of the acetal of penaldic ester G the latter is hydrolyzed to the acetal of penaldic acid G. Hydrolysis of an acetal of penaldic ester G may be carried out in a number of ways but a preferred procedure consists in treating such an acetal with just sufficient dilute alkali, to hydrolize the ester radical. The hydrolysis is usually carried out at ordinary room temperature or somewhat below. Particularly advantageous results have been obtained using an alkaline earth metal hydroxide, preferably barium hydroxide because of its greater solubility in water. When using an alkali metal hydroxide some splitting of the acetal may be effected unless precautions are taken. Using barium hydroxide, however, the acetal group is substantially unaffected.

It has also been noted that advantageous results are attained when the hydrolysis of an acetal of penaldic ester G is carried out in such manner that the reaction mixture contains two liquid phases in intimate contact, one of which contains most of the penaldic ester G and the other of which contains most of the barium hydroxide or other alkali. This result is achieved by using an aqueous solution of the alkali and maintaining the penaldic ester G acetal, which is only very slightly soluble in water, finely dispersed therein by efficient agitation. Under such conditions an alkali metal hydroxide may be used with satisfaction. In some instances, e. g., when the penaldic ester G acetal is of a viscous nature, it may even be advisable to dissolve it in an inert water-immiscible organic liquid to enable dispersion of the ester to be accomplished more readily. Suitable water-immiscible organic liquids include benzene, carbon tetrachloride, isopropyl ether and many others. The acetal ester of penaldic acid G is thus intimately dispersed in but is not dissolved by the solution of hydrolyzing agent. Better results are thus obtained when aqueous barium hydroxide, in which acetal esters of penaldic acid G are substantially insoluble, is used than when an alcoholic or aqueous alcoholic solution of barium hydroxide in which acetal esters of penaldic acid G are somewhat soluble, is used. When a solvent is used for the alkali which dissolves a substantial portion of the acetal ester of penaldic acid G the yield of acetal of penaldic acid G is unsatisfactory and the product is of low purity.

Following the hydrolysis, which is complete in a few hours, the acetal of penaldic acid G may be isolated from the reaction mixture by adding cracked ice and sufficient of a water-immiscible organic liquid such as chloroform, in which the acetal of penaldic acid G is soluble, to form a distinct layer, agitating and acidifying the entire mixture with ice-cold dilute mineral acid and allowing the layers to separate. The acid aqueous layer is preferably extracted with several additional portions of the water-immiscible organic liquid, the combined extracts washed once with a small amount of water, dried over anhydrous magnesium sulfate and the organic liquid vaporized under reduced pressure. The acetal of penaldic acid G remains as a residue. By proceeding in the manner just described, the acetals of the esters of penaldic acid G mentioned previously, as well as many others, may be converted to the corresponding acetals of penaldic acid G. The acetals of penaldic acid G are usually crystalline in nature and are obtained in the above manner in a state of high purity.

An acetal of penaldic acid G is converted readily upon treatment with an anhydride of an organic fatty acid, or substituted fatty acid such as acetic anhydride, propionic anhydride, butanoic anhydride, phenylacetic anhydride, and the like, to an ether of 2-benzyl-4-hydroxymethylene-5(4)-oxazolone. The reaction is carried out by warming a penaldic acid G acetal with several times it weight of acid anhydride at from about 40° to about 125° C. until all the solid has dissolved and then for several minutes longer. The solution is then concentrated under reduced pressure and the residue cooled, and preferably seeded. Upon filtering and washing the crystals, e. g., with ice-cold ethyl acetate, the oxazolone ether is obtained in a state of high purity. Further crops of crystals may be obtained by concentrating the filtrate, cooling, seeding and refiltering. In this way there may be prepared the methyl, ethyl, propy, n-butyl, iso-butyl, sec-butyl, benzyl, phenylethyl, cyclohexyl, methylcyclohexyl and other ethers of 2-benzyl-4-hydroxymethylene-5(4)-oxazolone.

The oxazolone ether may be hydrolyzed readily to 2-benzyl-4-hydroxymethylene-5(4)-oxazolone by stirring the finely powdered ether with just sufficient dilute aqueous alkali to hydrolyze the ether group. Although substantially any dilute aqueous alkali may be used, satisfactory results have been obtained using aqueous sodium hydroxide of somewhat less than molar concentration and carrying out the hydrolysis at about 0° C. The reaction is complete when the ether has substantially all dissolved, and usually requires from ½ to 2 hours. Frequently the crystalline salt of 2-benzyl-4-hydroxymethylene-5(4)-oxazolone separates as the reaction proceeds. Free 2-benzyl-4-hydroxymethylene-5(4)-oxazolone may be recovered from the reaction mixture, preferably after adding sufficient water to dissolve any salt thereof which may have separated, by adding a dilute mineral acid, such as hydrochloric acid, in amount substantially equivalent chemically to the alkali used in the hydrolysis step. The 2-benzyl-4-hydroxymethylene-5(4)-oxazolone is separated by filtering, washed thoroughly with cold water, and dried under reduced pressure. The product is of high purity and yields of from 80 to 95 per cent of the theoretical amount are obtained without difficulty.

The 2-benzyl-4-hydroxymethylene-5(4)-oxazolone is converted by treating it with an alcohol to an ester of penaldic acid G corresponding to the alcohol used. The reaction is carried out conveniently by refluxing a mixture of the hydroxymethylene compound, alcohol, and an inert solvent, such as benzene, cyclohexane, or dibutyl ether, for from several minutes to a few hour depending upon the alcohol used and the refluxing temperature of the reaction mixture. Volatile substances are then removed, preferably in a stream of an inert gas, such as nitrogen, and the semi-solid residue crystallized from an organic liquid, such as methylcyclohexane. If desired, the solution of penaldic ester G may be decolorized with charcoal before crystallizing. It is apparent that the particular ester of penaldic acid G obtained in this step is dependent entirely upon the alcohol used in treating 2-benzyl-4-hydroxymethylene-5(4)-oxazolone. Alcohols which may be used to form the corresponding ester of penaldic acid G include methyl, ethyl, benzyl, cyclohexyl, methylcyclohexyl, chlorocyclohexyl, propyl, butyl, hexyl, chlorobutyl, p-methylbenzyl alcohols and many others. It is likewise apparent that the particular ester which is obtained is entirely independent of the ester of phenaceturic acid which is used as a starting material. It is also apparent that the method outlined offers a convenient and positive way in which to pass from one ester of penaldic acid G to a different ester.

As mentioned previously an alpha, beta diester of penicilloic acid G may be prepared from a penaldic ester G, preferably from benzyl penaldate G, in a number of ways. Thus a penaldic ester G may be condensed with penicillamine to form an alpha monoester of penicilloic acid G and the latter esterified to form a diester, or a penaldic ester G may be condensed with a penicillamine ester and an alpha, beta diester of penicilloic acid G obtained directly. Penicillamine and its ester are usually employed in the form of their hydrochlorides or other hydrohalide salts.

The condensation of a penaldic ester G with penicillamine hydrochloride is carried out conveniently by warming the substances in approximately equi-molecular proportions together with sodium acetate or other suitable condensing agent suspended in sufficient dilute alcohol or other suitable organic diluent, such as dioxane or ethylene glycol, to permit the mixture to be stirred readily. Satisfactory results have been obtained by warming a mixture of equi-molecular proportions of penaldic ester G and penicillamine hydrochloride with about one half equi-molecular proportion sodium acetate and sufficient dilute alcohol to form a thin slurry. The reaction proceeds readily at from somewhat below 30° to 80° C. or higher. The reaction is usually finished in from a few minutes to several days and the resulting mixture, after filtering to remove precipitated sodium chloride, is in the form of a clear pale yellow solution. Upon adding water to this solution an oil separates which is extracted with chloroform or other suitable low-boiling organic liquid. The extract is washed with water, dried, and the organic solvent vaporized under reduced pressure. Separation of the product in crystalline form usually occurs without difficulty but may be facilitated by seeding. The product consists of substantially pure crystals of an alpha monoester of penicilloic acid G.

Alpha monoesters of penicilloic acid G may be esterified to form alpha, beta diesters of penicilloic acid G. Particularly satisfactory results are obtained, when the methyl ester of the beta carboxyl radical is desired, by esterifying the alpha monoester with diazomethane. It is merely necessary to suspend or dissolve the alpha monoester in a dry inert organic liquid, such as ether, benzene or cyclohexane, and add diazomethane to the mixture slowly, preferably dissolved in ether or other suitable organic liquid. Nitrogen is evolved and the diester is formed, the action taking place at room temperature or below. Slightly more than the theoretical amount of diazomethane is ordinarily used although the reaction is substantially quantitative. The reaction is accelerated somewhat by the addition of a few drops of methanol. Reaction is usually complete in a few minutes and excess diazomethane may be removed by warming the mixture gradually on the steam bath. The slightly colored solution of the diester may be decolorized with charcoal, the charcoal removed by filtering, and the solution washed with dilute aqueous sodium bicarbonate, then with water and dried over anhydrous magnesium sulfate. The solvent may then be volatilized under reduced pressure and the alpha, beta diester of penicilloic acid G obtained as a viscous oil or crystalline solid.

For the preparation of diesters other than the methyl ester the alpha monoester of penicilloic acid may be mixed with an alcohol corresponding to the beta ester desired and the mixture partially saturated with anhydrous hydrogen chloride. After several hours the alcohol and hydrogen chloride may be volatilized under reduced pressure, the residue taken up in ether or other suitable organic liquid and the solution washed with dilute alkali. The diester may then be recovered, if desired, according to the preceding paragraph.

The condensation of a penaldic ester G with a penicillamine ester hydrochloride is carried out conveniently by warming a mixture of the two substances and sodium acetate, preferably in about equi-molecular proportions, together with sufficient of an alkanol, such as methanol or butanol, to keep the mixture fluid. The reaction may be carried out at from about 20° to about 100° C. or higher. Reaction is complete in a few minutes and the diester may be recovered from the mixture by filtering to remove insoluble substances, adding water cautiously to the warm solution until cloudiness occurs and then seeding the mixture and allowing it to cool. After several hours the crystals are removed by filtering and dried under reduced pressure. There is thus obtained substantially pure alpha, beta diester of penicilloic acid G.

In certain instances it is advantageous in the preparation of a mono- or diester of penicilloic acid G from a penaldic ester G to first condense the latter with a primary amine, such as benzylamine, and to then react this amine derivative of penaldic ester G with penicillamine or its ester, usually in the form of its hydrochloride. The condensation of a penaldic ester G with a primary amine proceeds readily when the two substances are dissolved in approximately equi-molecular proportions in an organic liquid, such as alcohol, ether, or methylcyclohexane, and the solution warmed gently for several hours or allowed to stand for several days at ordinary room temperature. The condensation product usually separates as crystals which may be removed by filtering and which may be purified by crystallizing from a suitable organic solvent, such as methylcyclohexane or isopropyl ether containing a small proportion of benzene. In this way there may be formed condensation products of substantially any ester of penaldic acid G with substantially any primary amine. Penaldic esters which may be used include the methyl, ethyl, butyl, decyl, cyclohexyl, methylcyclohexyl, phenylethyl and benzyl esters and their substitution products. Amines which may be used include aniline, benzylamine, methylamine, butylamine, phenylhydrazine, semicarbizide, their substitution products, and many others. Benzyl amine is preferred because of the ease with which it reacts with a penaldic ester G and because the condensation products are usually crystalline solids which may be purified easily.

The condensation product of a penaldic ester G with a primary amine may be reacted readily with either penicillamine or a penicillamine ester, usually in the form of its hydrochloride, to form, respectively, an alpha monoester or an alpha, beta diester of penicilloic acid G. The condensation with penicillamine may be carried out conveniently by dissolving substantially equi-molecular proportions of an amine condensation product of penaldic ester G and penicillamine hydrochloride in alcohol or other suitable solvent and warming the solution on a steam bath for several minutes. When the reaction is substantially complete the solution is filtered and water is added slowly and with stirring to the filtrate until turbidity results. Seed crystals are then added and, after warming again slightly on the steam bath until most of the turbidity has disappeared, the solution is allowed to cool. Crystallization occurs and after standing several days is substantially complete. The crystals are removed by filtering, washed with cold dilute alcohol, and dried. If desired, the product may be recrystallized from alcohol and there is thus obtained an alpha monoester of penicilloic acid G in a state of high purity, the particular ester obtained depending upon the ester of penaldic acid G employed. This monoester may be esterified to form a diester as described previously.

Reaction of a condensation product of a primary amine and a penaldic ester G with a penicillamine ester may be carried out readily by dissolving substantially equi-molecular proportions of the condensation product and of a hydrochloride of a penicillamine ester in alcohol or other suitable solvent and warming on the steam bath for several minutes. The solution is then filtered to remove insoluble matter, the filtrate diluted carefully with water until turbidity occurs, seeded, and allowed to cool. After standing over night in the refrigerator crystals are removed by filtering, washed with dilute alcohol and dried under reduced pressure at slightly elevated temperatures. The alpha, beta diester of penicilloic acid G thus obtained may, if desired, be purified by crystallization from dilute alcohol, petroleum ether, or mixtures thereof.

It is to be noted that in the condensation of a penaldic ester G, or an amine condensation product thereof, with penicillamine the nature of the ester radical determines the nature of the alpha ester radical in the alpha monoester of penicilloic acid G which is formed. When a penicillamine ester is employed, rather than unesterified penicillamine, the nature of the ester radical of the penicillamine ester determines the nature of the beta ester radical in the alpha, beta diester of penicilloic acid G which is formed. Furthermore, it should be mentioned that optically active forms of penicillamine or of a penicillamine ester such as the d(+)- and l(−)-forms, may be employed and optically active forms of alpha monoester or of alpha, beta diester of penicilloic acid G obtained. An optically active form of an alpha monoester of penicilloic acid G may be esterified, e. g., with diazomethane, to produce an optically active alpha, beta diester of penicilloic acid G. Esters of penicillamine which may be condensed with esters of penaldic acid G, or with an amine condensation product thereof, include the methyl, ethyl, propyl, iso-propyl, hexyl, octyl, benzyl, methylbenzyl, cyclohexyl, and methylcyclohexyl esters as well as their halogen substitution products, and many others. Representative alpha, beta diesters of penicilloic acid G which may be prepared by the procedures herein described include the alpha-methyl-beta-methyl, the alpha-ethyl-beta-methyl, the alpha-butyl-beta-methyl, the alpha-chloroethyl-beta-methyl, the alpha-bromobutyl-beta-methyl, the alpha-cyclohexyl-beta-methyl, the alpha-methylcyclohexyl-beta-methyl, the alpha-benzyl-beta-methyl, the alpha-chlorobenzyl-beta-methyl, the alpha-methyl-beta-ethyl, the alpha-ethyl-beta-butyl, the alpha-benzyl-beta-chloroethyl, the alpha-benzyl-beta-benzyl, the alpha-benzyl-beta-chlorobenzyl, the alpha-cyclohexyl-beta-ethyl, the alpha-chloroethyl-beta-chlorobenzyl, the alpha-benzyl-beta-chloroethyl diesters and many others.

Selective hydrolysis of the alpha ester radical of an alpha, beta diester of penicilloic acid G is conveniently effected by dissolving the diester in aqueous methanol, ethanol or other water-soluble alkanol and adding portion-wise to the solution just sufficient of a dilute aqueous alkali, such as dilute aqueous sodium hydroxide, potassium hydroxide, potassium carbonate or barium hydroxide, to hydrolyze one of the ester groups. The mixture is allowed to stand, usually for from about 1 to 4 hours, at ordinary temperatures. The solution is then concentrated in vacuo to remove organic solvents and extracted, e. g., with ether to remove unhydrolyzed alpha, beta diester. The extracted aqueous solution contains the beta ester of penicilloic acid G in the form of its salt. The clear solution may be evaporated to dryness under reduced pressure and finally dried in vacuo over phosphorous pentoxide. The dry alkali metal salts of beta monoesters of penicilloic acid G are brittle solids which are exceeding hygroscopic.

Although the selective hydrolysis of substantially any alpha, beta diester of penicilloic acid G may be carried out with the production of a beta monoester of penicilloic acid G, the degree of selectivity of the hydrolysis has been found to be dependent in great measure upon the nature of the ester groups in the alpha and beta positions. Thus a diester of penicilloic acid G, in which the alpha ester radical per se is less easily hydrolyzed than the beta ester radical, is not hydrolyzed with as great a degree of selectivity as is a diester in which the alpha ester radical per se is more easily hydrolyzed than is the beta ester radical or even a diester in which both ester radicals are the same. For these reasons it is preferred, in preparing a beta monoester of penicilloic acid G by such selective hydrolysis, to choose a penaldic ester G from which the penicilloic acid diester is made which will yield a diester having a benzyl, methylbenzyl, chlorobenzyl or other easily hydrolyzable ester group in the alpha position, and to condense therewith an alkyl ester of penicillamine or, in case the penaldic ester G is condensed with unesterified penicillamine, to esterify the resulting alpha monoester of penicilloic ester G with an alkanol. Benzyl esters are more readily hydrolyzed than are certain other esters, such as straight chain alkyl esters, and by operating in this fashion high yields of beta monoesters of penicilloic acid G are obtained easily and in a state of high purity substantially uncontaminated with an alpha monoester of penicilloic acid G, or with unesterified penicilloic acid G. An additional advantage accruing to the use of a diester of penicilloic acid G in which the alpha ester radical is a benzyl ester rather than an ester radical containing a small alkyl radical, such as the methyl or ethyl radical, is the fact that when such benzyl ester radical is hydrolyzed a relatively large change in molecular weight of the compound is effected and the progress of the hydrolysis is followed easily by analytical procedures.

Alkali metal salts of the beta monoesters of penicilloic acid G are very soluble in water and are difficult to isolate in a state of high purity by concentrating the solution. Isolation of a beta monoester of penicilloic acid G in pure form from a soluble salt thereof may, however, be effected readily by dissolving the salt in water and adding sufficient aqueous lead acetate or other soluble lead salt to the solution to precipitate the lead salt of the beta monoester. The precipitated lead salt is collected by filtration, washed with water and suspended in water, dioxane, or alcohol. An excess of hydrogen sulphide is then passed into the suspension and precipitated lead sulfide removed by filtering, the beta monoester of penicilloic acid G remaining in solution. The excess of hydrogen sulphide is removed from the filtrate in a stream of nitrogen or other inert gas and the clear solution frozen and lyophilized. The beta monoester of penicilloic acid G is thus obtained in substantially pure form. The pure beta monoesters of penicilloic acid G are solid stable compounds soluble in water and many organic liquids and are sufficiently strong acids to dissolve immediately and completely in aqueous sodium bicarbonate with the evolution of carbon dioxide.

Conversion of a beta monoester of penicilloic acid G to a compound thought to be a hydrohalide of the corresponding ester of 2-benzyl-4-(4 - carboxy - 5,5 - dimethyl - thiazolidinyl - 2) - 5(4)-oxazolone, is effected by dissolving the monoester in an anhydrous organic liquid, such as ether, and adding to the solution somewhat more than one molecular proportion, based on the beta monoester, of a phosphorous trihalide, e. g., phosphorous tribromide, in the form of an ethereal solution. The reaction is carried out at ordinary temperatures and is accompanied by the immediate formation of a precipitate. This precipitate when recovered from the reaction mixture, e. g., by filtering and drying in vacuo, is a mixture consisting of a major proportion of beta-methyl-penicilloate G hydrohalide and a minor proportion of a product which, from a consideration of the infra red spectrum of the mixture, is thought to be a hydrohalide of an ester of 2-benzyl-4-(4-carboxy-5,5-dimethyl-thiazolidinyl-2)-5(4)-oxazolone.

Although the invention has been described with respect to compounds and processes wherein X in the foregoing formulae is selected from the group consisting of phenyl and benzyl radicals it is understood that one modification of the invention contemplates compounds and processes wherein X in the foregoing formulae represents, in addition to phenyl and benzyl, other aryl or aralkyl radicals, alkyl radicals, cycloalkyl radicals and substitution products thereof non-reactive under the reaction conditions. Such radicals include o-tolyl, m-tolyl, p-tolyl, xylyl, ethylphenyl, o-chlorophenyl, p-chlorophenyl, m-bromophenyl, o-fluorophenyl, p-nitrophenyl, alpha-naphthyl, beta-naphthyl, o-xenyl, p-xenyl, methyl-naphthyl, alpha-phenylethyl, beta-phenylethyl, naphthylethyl, methyl, ethyl, propyl, isopropyl, butyl, iso-butyl, tertiary-butyl, amyl, hexyl, decyl, hexadecyl, beta-chloroethyl, omega-bromobutyl, dichlorobutyl, cyclohexyl, methylcyclohexyl, phenylcyclohexyl, chlorocyclohexyl, and many others.

An additional modification of the invention contemplates compounds and processes wherein Y and Y' of the foregoing formulae represent, in addition to hydrogen and alkyl radicals, aryl radicals, aralkyl radicals, cycloalkyl radicals and substitution products thereof non-reactive under the reaction conditions. Such radicals include o-tolyl, m-tolyl, p-tolyl, m-bromophenyl, o-fluorophenyl, p-nitrophenyl, alpha-naphthyl, beta-naphthyl, o-xenyl, p-xenyl, methylnaphthyl, alpha-phenylethyl, beta-phenylethyl, naphthylethyl, beta-chloroethyl, omega-bromobutyl, dichlorobutyl, cyclohexyl, methylcyclohexyl, phenylcyclohexyl, chlorocyclohexyl, and many others. Y and Y' may be the same or different radicals.

Certain advantages of the invention are apparent from the following example, which is given by way of illustration only, and is not to be construed as limiting.

*Example—Benzyl phenaceturate*

A mixture of 96.5 grams of phenaceturic acid and 1 liter of benzyl alcohol was placed in a 2 liter round-bottomed flask equipped with a condenser and drying tube. The mixture was agitated by shaking and 39 grams of acetyl chloride was added slowly. The mixture was warmed over night. The reaction mixture was then cooled, extracted twice with 10 percent aqueous sodium carbonate solution, washed with water and dried with anhydrous potassium carbonate. Benzyl alcohol was volatilized under reduced pressure. The light yellow residue was cooled, dissolved in benzene, and diluted with hot methylcyclohexane until turbidity occurred. Upon cooling, filtering and drying, 123 grams, or 87 per cent of the theoretical amount, of pure benzyl phenaceturate was obtained melting at 93°–94° C.

Anal.—Calcd. for $C_{17}H_{17}NO_3$: C, 72.0; H, 6.95; N, 4.94. Found: C, 72.2; H, 6.29; N, 5.17.

We claim:
Benzyl phenaceturate.

STANLEY T. ROLFSON.
JAMES H. HUNTER.
JACK W. HINMAN.

REFERENCES CITED

The following references are of record in the file of this patent:

UNITED STATES PATENTS

| Number | Name | Date |
|---|---|---|
| 2,394,967 | Kushner | Feb. 12, 1946 |
| 2,453,478 | Weston | Nov. 9, 1948 |

OTHER REFERENCES

Zanna: "Gazzetta Chimica Italiani," vol. 11 (1881), p. 256.

Hotter: "J. Prakt. Chem.," Series 2, vol. 38 (1888), pp. 105, 107, 108.